US008228925B2

(12) United States Patent
Cai et al.

(10) Patent No.: US 8,228,925 B2
(45) Date of Patent: Jul. 24, 2012

(54) INTERACTIVE VOICE RESPONSE SYSTEM FOR ONLINE AND OFFLINE CHARGING AND FOR MULTIPLE NETWORKS

(75) Inventors: Yigang Cai, Naperville, IL (US); Sheng Chen, Beijing (CN); Xiang Yang Li, Beijing (CN); Peng Wang, Beijing (CN); Ying Wang, Beijing (CN); Rui Yun Wu, Beijing (CN); Jay Z. Zhao, Beijing (CN)

(73) Assignee: Alcatel Lucent, Paris (FR)

( * ) Notice: Subject to any disclaimer, the term of this patent is extended or adjusted under 35 U.S.C. 154(b) by 1923 days.

(21) Appl. No.: 11/300,951

(22) Filed: Dec. 14, 2005

(65) Prior Publication Data

US 2007/0133575 A1    Jun. 14, 2007

(51) Int. Cl.
*H04L 12/28* (2006.01)
(52) U.S. Cl. .................................. 370/401; 379/114.22
(58) Field of Classification Search ...... 379/114.01–132, 379/265.01–266.1; 370/401
See application file for complete search history.

(56) References Cited

U.S. PATENT DOCUMENTS

| 6,182,045 | B1 |  | 1/2001 | Kredo et al. |
| 6,301,703 | B1 | * | 10/2001 | Shank et al. ................... 717/109 |
| 6,587,822 | B2 |  | 7/2003 | Brown et al. |
| 6,621,502 | B1 | * | 9/2003 | Nair et al. ...................... 715/716 |
| 6,763,104 | B1 |  | 7/2004 | Judkins et al. |
| 6,819,756 | B2 |  | 11/2004 | Stumer et al. |
| 7,054,417 | B2 | * | 5/2006 | Casey et al. ................. 379/88.17 |
| 7,054,421 | B2 | * | 5/2006 | Kandlur et al. ............. 379/93.15 |
| 7,065,203 | B1 | * | 6/2006 | Huart et al. ............... 379/266.06 |
| 7,180,985 | B2 | * | 2/2007 | Colson et al. ............... 379/88.16 |
| 7,212,516 | B1 | * | 5/2007 | O'Sullivan et al. ........... 370/352 |
| 2001/0013001 | A1 |  | 8/2001 | Brown et al. |
| 2002/0091601 | A1 | * | 7/2002 | Fellingham et al. ............ 705/34 |
| 2002/0164011 | A1 |  | 11/2002 | Stumer et al. |
| 2003/0112931 | A1 |  | 6/2003 | Brown et al. |

(Continued)

OTHER PUBLICATIONS

3GPP Ts 32.240 V6.3.0 (Sep. 2005) 3rd Generation Partnership Project; Technnical Specification Group Services and System Aspects; Telecommunication management; Charging management; Charging architecture and principles (Release 6).* Hakala, et al., Diameter Credit-Control Application, Mar. 15, 2004, pp. 1-106.
Calhoun, et al., Diameter Base Protocol, Sep. 2003, pp. 1-147.

(Continued)

*Primary Examiner* — Fan Tsang
*Assistant Examiner* — Assad Mohammed
(74) *Attorney, Agent, or Firm* — Jenner & Block, LLP

(57) ABSTRACT

An interactive voice response system (102) includes a protocol interface (134) that is adapted to communicate with a plurality of divergent telecommunications networks for voice communications (104, 106, 108, 110). These networks are, for example, a wireline telecommunications network, a CDMA network, a GSM network, and a voice over IP network. A controller (136) is coupled to the protocol interface to receive a plurality of common call control messages from, and to supply a plurality of common call control messages to, the protocol interface. The protocol interface converts control messages from each one of the plurality of divergent telecommunications networks into the plurality of common call control messages for the controller. The controller generates and receives the common call control messages to cause a prompt and collect interaction with a caller that is using a device that is coupled to one of the networks. The common call control messages generated by the controller are converted by the protocol interface into control messages that are appropriate for the particular network that is to receive the control message. That is, the common call control messages are converted to the network's protocol.

20 Claims, 6 Drawing Sheets

U.S. PATENT DOCUMENTS

| | | | |
|---|---|---|---|
| 2003/0204404 A1* | 10/2003 | Weldon et al. | 704/270.1 |
| 2004/0120479 A1 | 6/2004 | Creamer et al. | |
| 2004/0120502 A1* | 6/2004 | Strathmeyer et al. | 379/265.01 |
| 2004/0234047 A1* | 11/2004 | Ciccarelli et al. | 379/88.16 |
| 2005/0025293 A1 | 2/2005 | Romeo et al. | |
| 2005/0047559 A1 | 3/2005 | Colson et al. | |
| 2005/0058270 A1* | 3/2005 | Allen et al. | 379/220.01 |
| 2005/0069102 A1 | 3/2005 | Chang | |
| 2005/0069103 A1 | 3/2005 | DiVenuta et al. | |
| 2005/0074101 A1* | 4/2005 | Moore et al. | 379/114.01 |
| 2005/0102424 A1* | 5/2005 | Foll et al. | 709/240 |
| 2005/0125342 A1* | 6/2005 | Schiff | 705/39 |
| 2006/0029190 A1* | 2/2006 | Schultz | 379/88.01 |
| 2006/0062373 A1* | 3/2006 | Chervets et al. | 379/265.03 |
| 2006/0074623 A1* | 4/2006 | Tankhiwale | 704/1 |
| 2006/0126584 A1* | 6/2006 | Zhang et al. | 370/338 |
| 2007/0041536 A1* | 2/2007 | Koskinen et al. | 379/114.28 |

OTHER PUBLICATIONS

3GPP TS 32.200 V5.6.0 (Mar. 2004), Release 5, pp. 1-89, 3GPP Organizational Partners, Valbonne, France.

3GPP TR 22.977 V6.0.0 (Sep. 2002), Release 6, pp. 1-25, 3GPP Organizational Partners, Valbonne, France.

3GPP TS 22.243 V6.4.0 (Sep. 2003), Release 6, pp. 1-15, 3GPP Organizational Partners, Valbonne, France.

3GPP TS 32.299 V6.4.0 (Sep. 2005), Release 6, pp. 1-88, 3GPP Organizational Partners, Valbonne, France.

3GPP TS 23.228 V6.4.1 (Jan. 2004), Release 6, pp. 1-159, 3GPP Organizational Partners, Valbonne, France.

3GPP TS 32.240 V6.3.0 (Sep. 2005), Release 6, pp. 1-39, 3GPP Organizational Partners, Valbonne, France.

Why leading enterprises choose Genesys, Internet, Oct. 31, 2005, pp. 1-2, http://www.genesyslab.com.

* cited by examiner

INTERACTIVE VOICE RESPONSE SYSTEM FOR ONLINE AND OFFLINE CHARGING AND FOR MULTIPLE NETWORKS

FIELD OF THE INVENTION

The present invention relates generally to interactive voice response call control systems for telecommunications systems, and in particular, to an interactive voice response call control system for online and offline charging applications in multiple telecommunications network environments.

BACKGROUND OF THE INVENTION

Interactive voice response (IVR) systems are widely employed for information service, purchase ordering, bank services, making appointments, conference and meeting registration, legal and health consultations, and telecommunications services. Interactive voice systems serve as a front end interface through which a caller can access data processing systems. The IVR system provides prompts to the caller and receives touchtone and or spoken responses from the caller. Through prompt and response interactions, the IVR system collects sufficient information about the caller to direct the caller's call to an appropriate resource, such as an information processing system or the like.

IVR systems are presently deployed in diverse telecommunications network environments. For example, IVR systems are used in wire-line telecommunications networks, GSM (global support for mobile) networks, CDMA (code division multiple access) networks, IMS (IP multimedia subsystem) networks and voice over IP (internet protocol) networks. Invariably, the IVR system for one network is generally not amenable to operation in another network. Also, IVR systems are typically designed to work with an online charging system or an offline charging system, but not both. In the online charging system, charging information for network resource usage is collected concurrently with resource usage and can affect, in real-time, the service rendered. For example, a prepaid call may be disconnected when the prepaid balance is reached. In an offline charging system, charging information for network resource usage is collected concurrently with resource usage and subsequently processed using post-processing systems, but the charging information does not affect in real-time the service rendered. The 3rd Generation Partnership Project (3GPP) charging management specifications (3GPP TS 32.240~32.299) provide guidelines for online and offline charging systems. See 3gpp.org. The limitations on prior IVR systems restrict the reuse of the IVR system for divergent networks and divergent charging systems. This is undesirable because it adds cost to a service provider in employing multiple network technologies and different charging systems.

Therefore, a need exists for an improved IVR system with support for multiple networks and multiple charging.

SUMMARY OF THE INVENTION

The need is met and an advance in the art is made by the present invention, which provides an interactive voice response call control system that interfaces simultaneously to multiple telecommunications networks.

The interactive voice response system includes a protocol interface that is adapted to communicate with multiple divergent telecommunications networks for voice communications. These networks are, for example, a wireline telecommunications network, a CDMA network, a GSM network, and a voice over IP network. The protocol interface converts control messages from each one of the telecommunications networks into a common set of call control messages. A controller is coupled to the protocol interface to receive the common set of call control messages from, and to supply those messages to, the protocol interface. The controller generates and receives the common set of control messages to cause a prompt and collect interaction with a caller that is using a device that is coupled to one of the plurality of telecommunications networks. The common set of control messages generated by the controller are converted by the protocol interface into control messages that are appropriate for the particular network that is to receive the control message.

Preferably, an online charging interface and an offline charging interface are included with the interactive voice response system to couple the controller with an online charging system and an offline charging system, respectively. And, preferably, a server is coupled to the interactive voice response system to provide prompts to the caller over a voice path and receive responses to the prompts from the caller.

A method according to the invention includes receiving calls from multiple of telecommunications networks. At least two of the networks operate according to different protocols. Control messages from the networks are converted into one common set of control messages. And, any of the common set of messages that are destined for a network are converted to the appropriate protocol for that network. The common set of control messages are generated and received in order to facilitate prompt and collect operations with a caller.

DETAILED DESCRIPTION OF THE PREFERRED EMBODIMENTS

Figure 1:
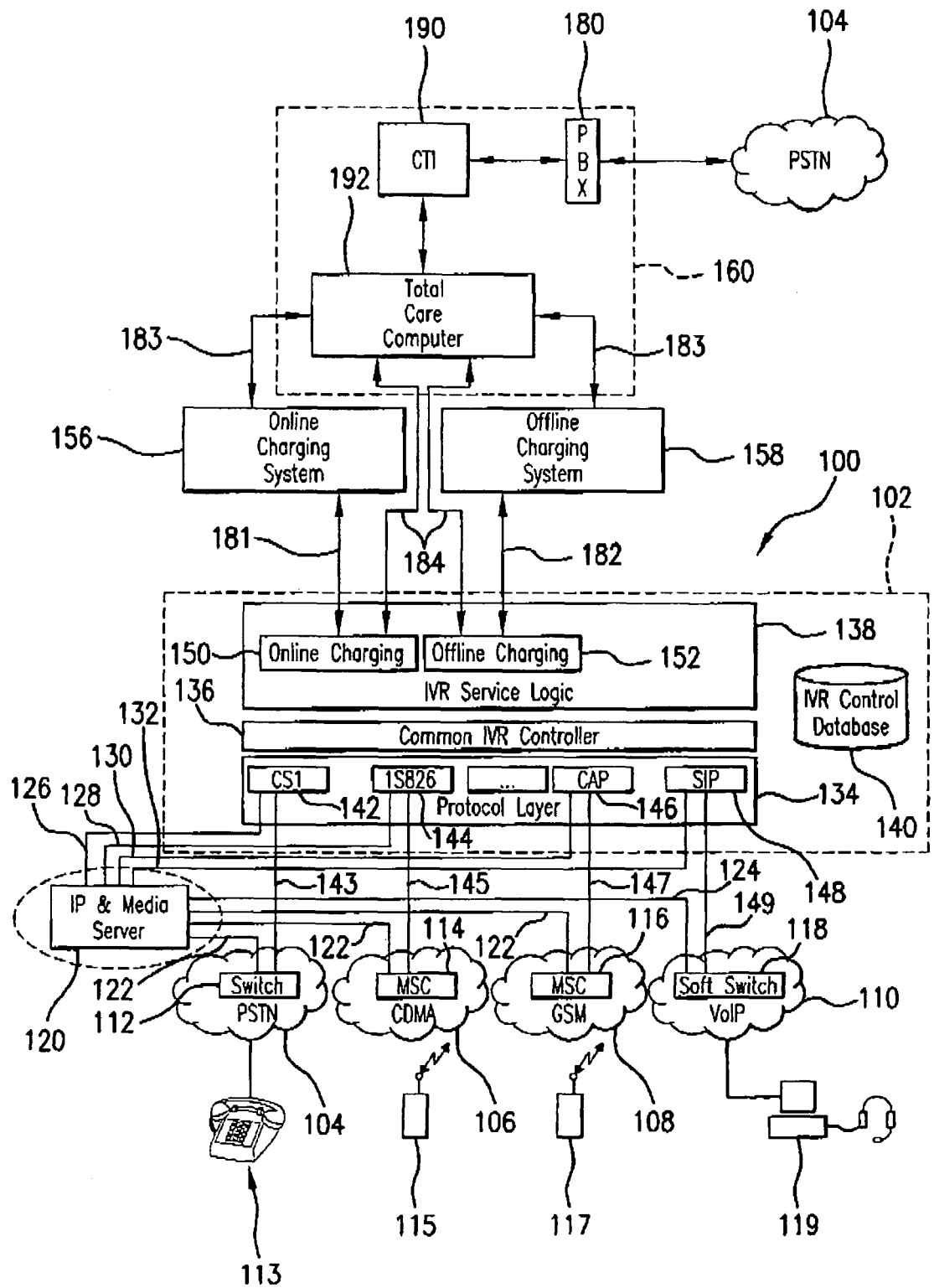
FIG. 1 is a block diagram of a telecommunications system including an interactive voice response system in accordance with an embodiment of the present invention.

FIG. 1 is a block diagram of a telecommunications system in accordance with an embodiment of the present invention. Telecommunications system 100 includes an interactive voice response (IVR) system 102 in accordance with an embodiment of the present invention. IVR system 102 is shown in FIG. 1 coupled to multiple telecommunications networks for voice communications with callers. More specifically, IVR system 102 is coupled to the public switched telephone network (PSTN) 104, a CDMA network 106, a GSM network 108 and a VoIP network 110. PSTN 104 is coupled to IVR system 102 via a switch 112. PSTN 104 couples telephones, such as telephone 113, and other PSTN devices to IVR system 102. PSTN 104 is generally the fixed wire-line telephone communication network. CDMA network 106 is coupled to IVR system 102 via a mobile switching system (MSC) 114. CDMA network 106 couples mobile telephones, such as mobile phone 115, to IVR system 102. GSM network 108 is coupled to IVR system 102 via a mobile switching system (MSC) 116. GSM network 108 couples mobile phones, such as mobile phone 117, and other GSM capable devices to IVR system 102. VoIP network 110 is coupled to IVR system 102 via a soft switch 118. Soft switch 118 couples IP capable devices, such as VoIP phone 119, to IVR system 102. Communication links connect the switch 112, MSC 114, MSC 116, and soft switch 118 to the IVR system 102. Calls from devices coupled to PSTN 104, CDMA network 106, GSM network 108 or VoIP network 110 traverse the appropriate network and are coupled to IVR system 102 for a prompt and response interaction in accordance with an embodiment of the present invention.

Telecommunications system 100 preferably includes an IP (intelligent peripheral) and media server 120 that is coupled to IVR system 102. IP and media server 120 is also preferably coupled to each of networks PSTN 104, CDMA 106, GSM 108 and VoIP 110, via switch 112, MSC 114, MSC 116, and soft switch 118, respectively. ISUP (Integrated Service User Part) links 122 connect switch 112, MSC 114 and MSC 116 to IP and media server 120. RTP (real-time transport protocol) link 124 connects soft switch 118 to IP and media server 120. Communications links 126, 128, 130 and 132 connect IVR system 102 to IP and media server 120.

Preferably, IP and media server 120 provides common capabilities to the multiple networks through which callers access the IVR system. More specifically, IP and media server 120 plays announcements, collects digits, generates tones, provides speech recognition and plays speech generated from text. For circuit switched networks, IP and media server 120 is controlled by the IVR system 102 using out-of-bound intelligent network protocol, such as CS1 (capability set 1), IS-826 (interim system 826), and CAP (customized application for mobile network enhanced logic application protocol) over links 126, 128, and 130, respectively. For the packet network, IP and media server 120 is controlled by the IVR system 102 using SIP protocol over link 132. For voice communication between the IP and media server 120 and callers over circuit networks, IP and media server 120 supports in-bound ISUP signaling, as shown by links 122. For voice communication between IP and media server 120 and callers over a packet network, the RTP protocol is used, as shown by link 124.

IVR system 102 includes a protocol layer 134 that interfaces to the networks 104, 106, 108 and 110, via an appropriate protocol, including any software and hardware interfaces. More specifically, CS1 protocol 142 interfaces IVR system 102 to switch 112 via link 143; IS826 protocol 144 interfaces IVR system 102 to MSC 114 via link 145; CAP protocol 146 interfaces MSC 116 to IVR system 102 via link 147; and SIP protocol 148 interfaces IVR system 102 to soft switch 118 via link 149. The protocol layer translates the various network protocols from and to a common set of IVR call control messages that are used to communicate with a common IVR controller 136.

Common IVR controller 136 has all the IVR characteristics and features used with different network protocols. Common IVR controller 136 provides a unified common interface to the IVR service logic 138 and enables the IVR service logic to be independent from any detailed network implementation. IVR service logic 138 provides the logic to navigate through menus and execute service features, such as database queries, calls and other actions. Advantageously, common IVR controller 136 greatly saves the service provider's investment, operation and maintenance cost. IVR system 102 also reduces the vendor's IVR service development cost, since the same IVR service logic may be deployed for multiple networks.

IVR service logic 138 preferably includes an online charging interface 150 and an offline charging interface 152. The online charging interface 150 couples the IVR system 102 to an online charging system 156 via communications link 181. Online charging system 156 maintains account information, including balance information for an online charging account, and other charging information. Real-time prepaid and real-time postpaid charging are performed in the online charging system. Communications link 181 preferably is an Ro or LDAP (lightweight directory access protocol) interface. Ro protocol is defined in 3GPP TS 32.299. See 3gpp.org. LDAP is defined in IETF RFC 3377. See ietf.org. The offline charging interface 152 couples the IVR system 102 to an offline charging system 158 via communications link 182. The offline charging system 158 maintains charging information, including records for a billing system to use in generating invoices. Communications link 182 is preferably an Rf or LDAP interface. Rf protocol is defined in 3GPP TS 32.299. Online charging system 156 is coupled to the call center 160 via communications link 183 and offline charging system 158 is coupled to the call center 160 via communications link 183. Preferably, communications links 183 are a SOAP (simple object access protocol) XML (extended marked language) interface, as defined by a W3C Recommendation. See w3.org. Call center 160 is alternatively coupled to the online charging interface 150 and the offline charging interface 152 via communications links 184. Communication links 184 are preferably LDAP interfaces.

In an online charging system, charging information for network resource usage is collected concurrently with resource usage and authorization for network usage is obtained by the network prior to permitting resource usage. Authorization may be limited in scope, for example, volume or duration, and additional authorization may be required or resource usage may be limited according to the authorization. Online charging is a mechanism where charging information can affect, in real-time, the service rendered. In an offline charging system, charging information for network resource usage is collected concurrently with resource usage and subsequently processed using post-processing systems, but the charging information does not affect in real-time the service rendered.

Control database 140 stores subscriber profile information, and location information for messaging to the online and offline charging systems and for queries and the like for the call center. Other application specific information may be stored in control database 140.

The online charging interface 150 enables access to real time prepaid or postpaid account information from the online charging system 156. IVR service logic 138 is used for real-time charging of an account balance for IVR operations. For example, a user accesses the IVR system to change the telephone numbers associated with a "friends and family" telecommunications feature. This type of change requires payment of a fee. The IVR sends a charging request to the online charging system 156 for credit authorization and to deduct the fee from the user's balance in online charging system 156.

The offline charging interface 152 enables access to batch rating postpaid account information. The IVR service logic 138 makes charging request to the offline charging system 158. In response to the offline charging requests, the offline charging system creates charging data records to store the charging information. This charging information is typically processed in a batch job at the end of a billing cycle.

Communication links 184 are used to directly access the total care computer 192 through the IVR system 102. In other words, a caller is directly connected to total care computer 192 without accessing an operator via the PSTN 104. Through this interface, the caller's responses from the IVR interaction are translated by computer 192 into commands that are sent over links 183 to the online charging system 156 and the offline charging system 158, if necessary.

Call center 160 includes an interface 180 to the PSTN 104. The interface 180 is used to connect callers to the IVR system to operators at computer telephone integration (CTI) terminals 190. The CTI terminals 190 are preferably coupled to the total care computer 192. Through the CTI terminals 190 operators receive information from callers and enter and retrieve information for the callers through the total care computer 192. Through the total care computer, an operator submits online or offline charging requests to the online charging system 156 or the offline charging system via links 183.

IVR system 102 is preferably implemented with one or more processors with hardware and software interfaces for connecting to the network protocols supported in the protocol layer or interface 134 and the interfaces to the online and offline charging systems and call center 160. The processor(s) run programs to implement the functions described above and further below. In a preferred embodiment the IVR system is implemented on a LUCENT MILIFE™ Application Server platform that has multiple processors and is capable of running different operating systems and other software, including UNIX and JAVA. The MILIFE™ Application Server is available from Lucent Technologies Inc., Murray Hill, N.J.

IP and media server 120 is preferably implemented with one or more processors with hardware and software interfaces for connecting to the network protocols supported in the protocol layer or interface 134. The processor(s) run programs to implement the functions described above and further below.

controller 136 provides call setup handling 202, prompt and collection handling 204, call monitoring 206 and end call handling 208. Call setup handling 202 authenticates the subscriber account and establishes the call parameters, such as call location zone, time zone, and roaming/home roaming, for use by IVR service logic 138. Call setup handling 202 extracts the called number, which is used to determine the appropriate IVR service logic function. The parameters used by call setup handling 202 are received via the protocol layer 134 from the network connecting the call to the IVR system 102. For example, for a call from CDMA network 106, the incoming call and the appropriate parameters are received by the protocol layer 134 via link 145. And, the protocol layer 134 sends the information to call setup handling 202.

Prompt and collection handling 204 determines prompts based on instructions from the IVR service logic 138. Prompt and collection handling 204 also collects the responses and returns the responses to the IVR service logic 138. Each location within a service logic function where a prompt and collect operation is invoked is defined as a service point 210.

Call monitoring 206 enables the common IVR controller 136 to maintain an IVR state machine that is a real time monitor of IVR call status, for example, response time expiration, re-prompts and the re-try limit. End call handling 208 controls the release of network resources when a user exits an IVR service.

As discussed above with respect to FIG. 1, protocol layer 134 interfaces the telecommunications network protocols to the IVR system 102. More specifically, protocol layer 134 translates the various network protocols to and from a common set of IVR call control messages for common IVR controller 136. In one embodiment, network protocols are mapped to common IVR call control messages as shown in the table below. Notably, a common IVR call control message may result in multiple protocol messages.

Table of Common IVR Call Control Messages and Protocol Messages

| Common IVR call control Message | CS1 (PSTN) | CAMEL (GSM) | IS-826 (CDMA) | SIP (VoIP) |
|---|---|---|---|---|
| Initial Call Setup | InitialDP | InitalDP | ORREQ, ANALYZD | SIP INVITE, 200 OK, ACK |
| Establish Connection To IP | Establish Temporary Connection, Assist Request Instructions, Connect To Resource | Establish Temporary Connection, Assist Request Instructions, Connect To Resource | SEIZERES, seizeres, CONNRES, INSTREQ | SIP INVITE, 200 OK, ACK |
| Play Announcement | Play Announcement | Play Announcement | SRFDIR | SIP INFO method |
| Prompt and Collect Message | Prompt And Collect User Information Requst | Prompt And Collect User Information request | SRFDIR | SIP INFO method |
| Prompt and Collect Result | Prompt And Collect User Information Return Result | Prompt And Collect User Information Return Result | srfdir | SIP 200 OK method |
| Disconnection with IP | Disconnect Forward Connection | Disconnect Forward Connection | instreq | SIP BYE, 200 OK |
| Disconnect Call | Release, Release Complete | Release, Release Complete | orreq, analyzd | SIPBYE, 200 OK |

Figure 2:
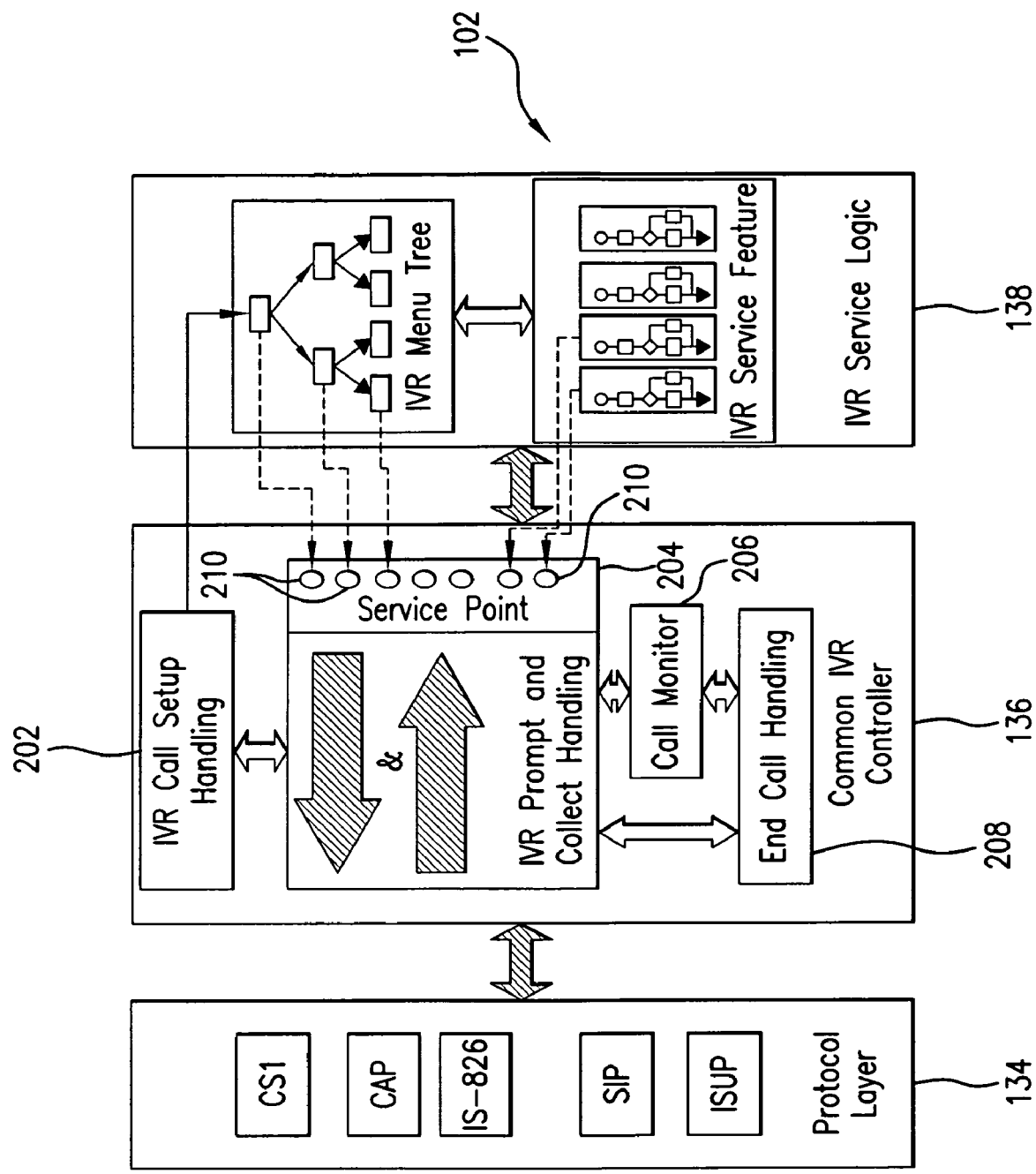
FIG. 2 is a block diagram of the interactive voice response system shown in FIG. 1.

FIG. 2 is a block diagram showing IVR system 102 in further detail, including protocol layer 134, common IVR controller 136 and IVR service logic 138. Common IVR An example of the mapping for the Establish-Connection-to-IP common message for CDMA network 106 using IS-826 messages is given below:

1. Protocol layer 134 first sends a SEIZERES message to the IP and media server 120, to reserve IP resources, and then obtains a TLDN (temporary local directory number) resource in the response seizeres message.

2. Protocol layer 134 then sends CONNRES message and indicates to the MSC 114 to use the TLDN to establish the voice path between MSC 114 and IP and media server 120.

3. When the voice path is established between MSC 114 and IP and media server 120, the IP and media server 120 will send INSTREQ to the protocol layer 134 to indicate the connection is established.

An example of the mapping for the Establish-Connection-to-IP common message for GSM network 108 using IS-826 messages is given below:

1. Protocol layer 134 first sends Establish Temporary Connection message to MSC 116 to indicate to create a connection between the MSC 116 and IP and media server 120.

2. MSC 116 sends the voice trunk set up request to IP and media server 120.

3. IP and media server 120 sends the set up acknowledge to MSC 116.

4. At the same time, IP and media server 120 also sends Assist Request Instructions to protocol layer 134.

5. The protocol layer 134 returns a Connect To Resource message to IP and media server 120.

Figure 3:
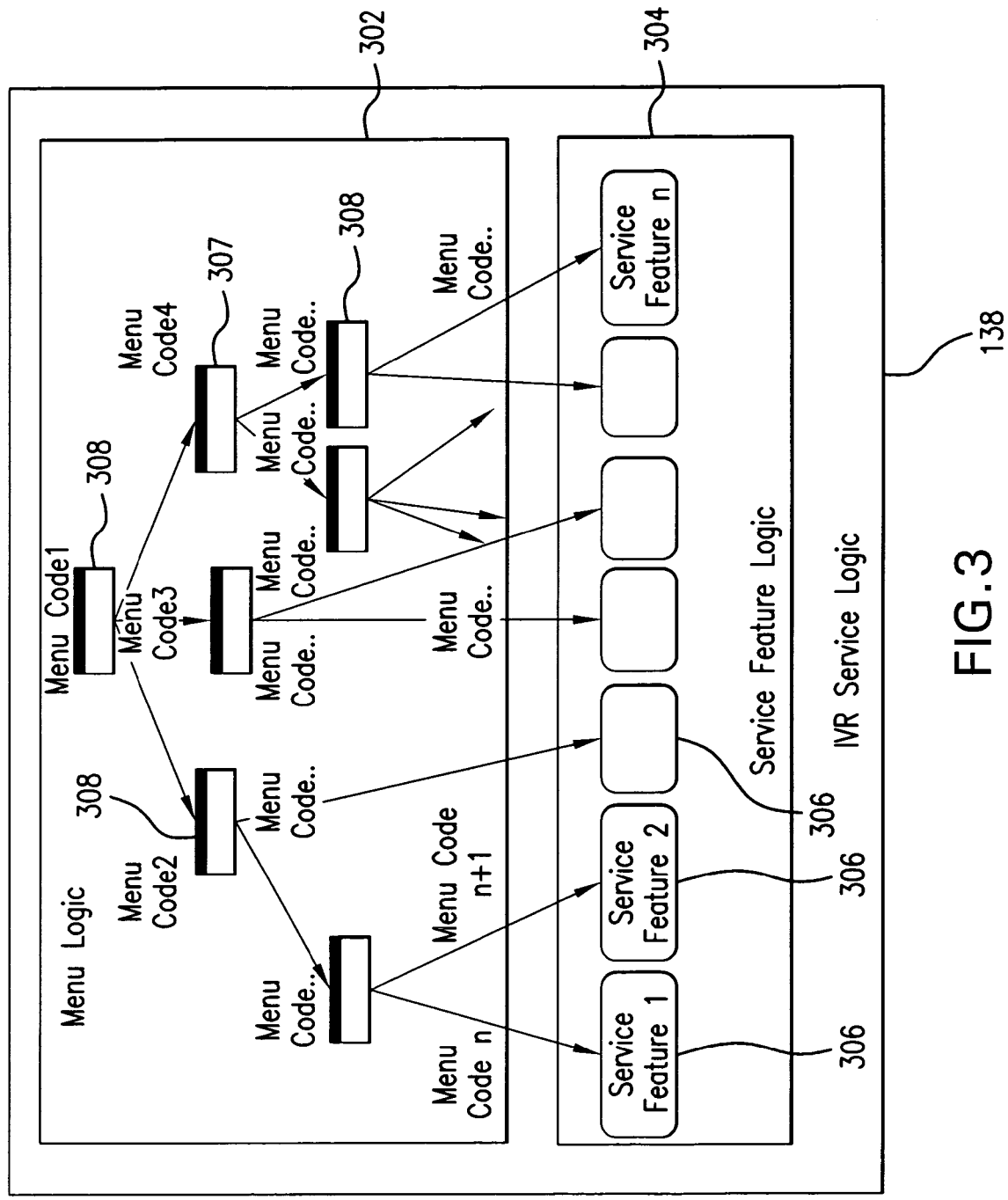
FIG. 3 is block diagram illustrating an architecture of the service logic for the interactive voice response system shown in FIG. 1.

FIG. 3 is a block diagram showing an embodiment for an architecture for IVR service logic 138. IVR service logic 138 is separated into menu logic 302 and service feature logic 304. The menu logic 302 uses a tree structure to navigate from one menu 308 to another for a particular service. The service feature logic 304 provides multiple service features 306, each of which performs a specific function, for example, a query to the online charging system 156 for an account balance. Utilizing a menu structure separates the menu logic or flow through the IVR service from the service features. This enables efficient use of the service features since multiple menu structures may access the same service features. Also, a change in a menu flow does not necessitate a change in a service feature, and vice versa.

An IVR service using IVR system 102 is defined by menu logic composed of a hierarchical series of menus, prompt and collect operations, and invocations of service features. The preferred operations defined for composing or implementing menu logic are: traverse to sub-menu, access service feature, immediate top-level menu return, menu repeat operation, and IVR exit operation. The traverse to sub-menu operation enables the user to traverse to the next level IVR menu. The access service feature operation invokes a service feature. The immediate top-level menu return operation returns the user to the top-level menu. The menu repeat operation causes the menu to be repeated. The IVR exit operation enables a user to exit the service.

Figure 4:
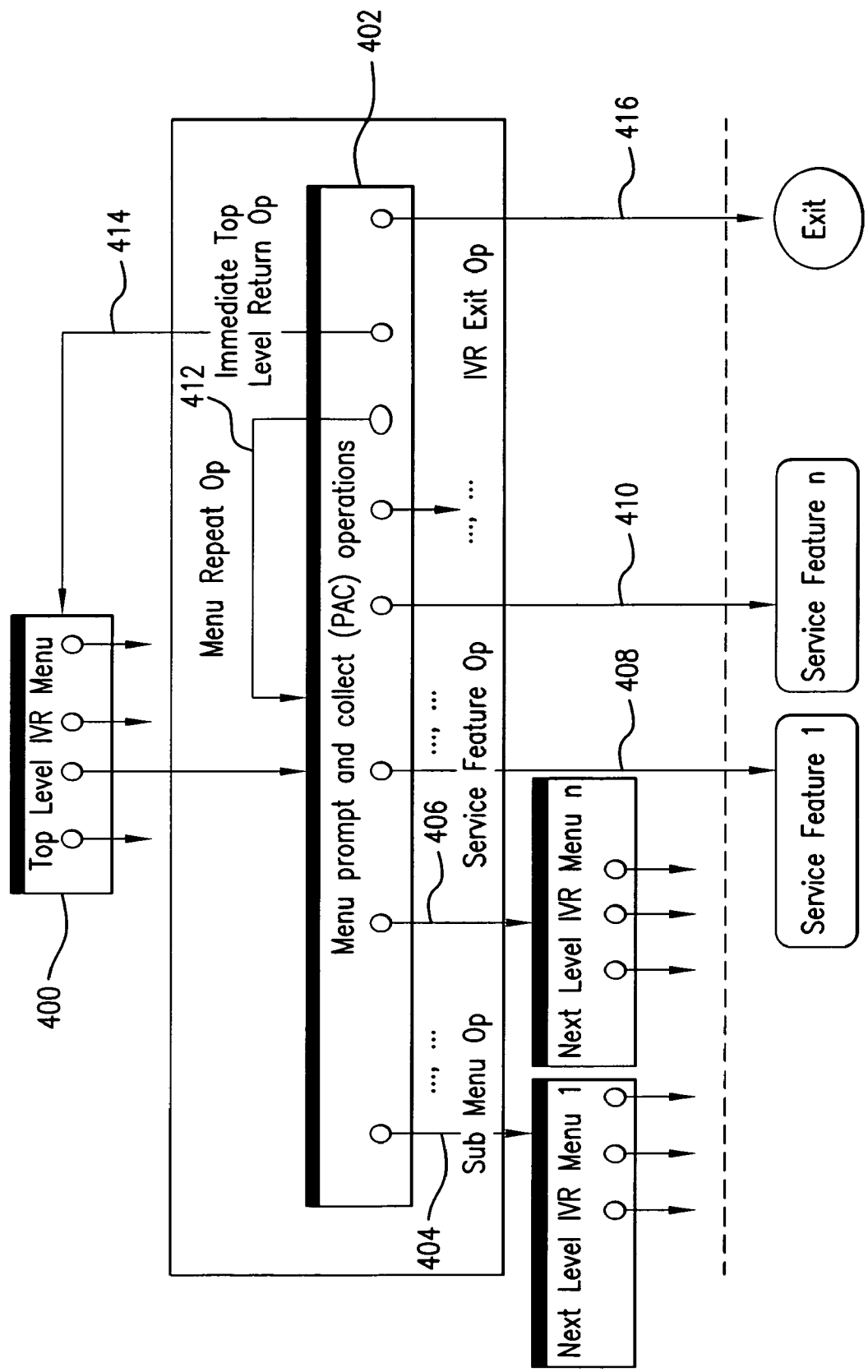
FIG. 4 is a block diagram illustrating the menu tree logic for the interactive voice response system shown in FIG. 1.

FIG. 4 shows an exemplary menu logic structure for an IVR service. The service has a top level menu 400. Top level menu 400 is the entry point for the IVR service. Top level menu 400 has four options for a user to select, but only the path from the second option is shown further in FIG. 4. Top level menu 400 initiates a prompt and collect (PAC) operation to prompt a user to select one of the options available at top level menu 400. Based upon the response from the PAC operation, an option is selected. A traverse to sub-menu operation permits a user to move from top level menu 400 to menu 402. At menu 402 a PAC operation prompts a user to select a menu option and collects the response for the menu logic. Some options available at menu 402 cause a traverse to sub-menu operation, as illustrated by arrows 404 and 406. These operations take a user to another level of menus. Some options at menu 402 cause an access service feature operation, as illustrated by arrows 408 and 410. Menu 402 also includes a menu repeat operation, which repeats the menu 402 options via a repeat of the PAC operation, as illustrated by arrow 412. Menu 402 also includes an immediate top-level menu return operation, as illustrated by arrow 414. Finally, menu 402 includes an IVR exit operation, as illustrated by arrow 416. This takes a user out of the IVR service.

Figure 5:
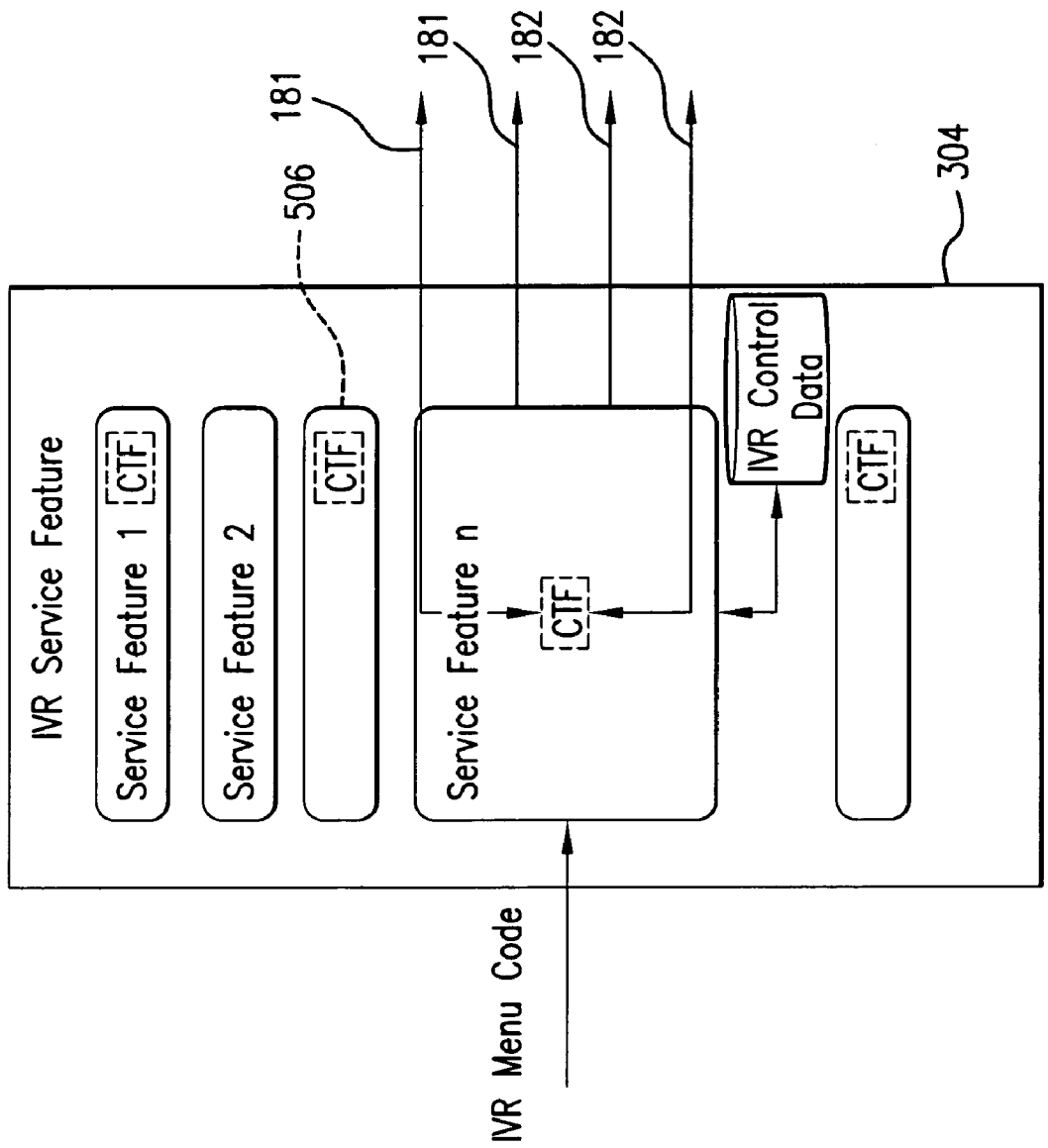
FIG. 5 is block diagram illustrating a service feature for the interactive voice response system shown in FIG. 1.

FIG. 5 is a diagram illustrating the architecture of the service feature logic 304. Multiple service features are implemented as a part of the service logic 138. The service features are accessed from the menu logic 302. Preferred service features for IVR system 102 include, charging history query, residual balance query, language selection, friend and family list review, outgoing and incoming call screening list review, modification or deletion, tariff plan selection, subscriber PIN (personal identification number) modification, and redirect to a help desk or customer service representative. Of course other service features are readily implemented.

Each service feature preferably performs or executes the service logic, and accesses (e.g., query, update, or delete) the online charging or offline charging system to get the specific account profile data. An LDAP interface is preferably used to interface directly with an online charging system, an offline charging system, and a call center 160 (see FIG. 1, FIG. 2). Based on the service feature return result, the IVR system notifies the result to a user or sends a further prompt and collect message to the user.

Service features also contain an optional charging trigger function (CTF) 506 to generate the charging event for the service feature. For example, the service provider may charge the subscriber for modifying a friend and family list. Operation of the service feature may be dependent on subscriber data stored or provisioned in the IVR control data 140. CTF 506 sends and receives the charging information to online charging system 156 or offline charging system 158.

As discussed above with respect to FIG. 2, each location within a service logic function where a prompt and collect operation is invoked is defined as a service point 210. Both the menu logic 302 and the service logic 304 may have service points 210. The service points provide a uniform mechanism to allow the service provider to define common PAC (prompt and collect) operation control rules. Preferred, but not exclusive, parameters for each service point and definitions for the parameters are as follows:

Maximum number of digits to collect: This parameter specifies the maximum number of digits to collect in response to a prompt.

Minimum number of digits to collect: This parameter specifies the minimum number of digits to collect in response to a prompt.

Interpretability: This parameter indicates whether the announcement is interruptible or not interruptible.

Number of re-prompts and re-prompt announcement ID, final re-prompt announcement ID: These parameters control the number of times the service logic repeats a prompt, if the user fails to provide a response to the prompt. The re-prompt announcement ID identifies the message or content that is used in the repeat prompt. As the name suggest, the final re-prompt announcement ID identifies the message that is used in the final repeat prompt.

First digit waiting timeout period: This parameter indicates the timeout period for the first digit collection before the operation will be treated as an error.

Interim digit timeout period: This parameter indicates the timeout period between dialed digits before the operation will be treated as an error.

End of reply digits: This parameter indicates the dialed digit(s) that causes the collected digits to be returned to the IVR call control.

Cancel digits: This parameter indicates the dialed digit(s) that causes the last collected digit to be deleted.

Announcement group capability: This parameter provides the group of announcements, including announcement IDs, includes maximum, and minimum announcement ID and variable decimal digit announcement capability.

Dialed digit confirm process: This specifies data for prompt and collect operations that require the user to confirm the supplied digits are correct by using the user input device after a prompt repeating the supplied digits. For example, "If '60649' is the zip code you entered, please press 1, or if '60649' is not the zip code you entered, please press 2, where "60649" was supplied in response to an earlier prompt.

Figure 6:
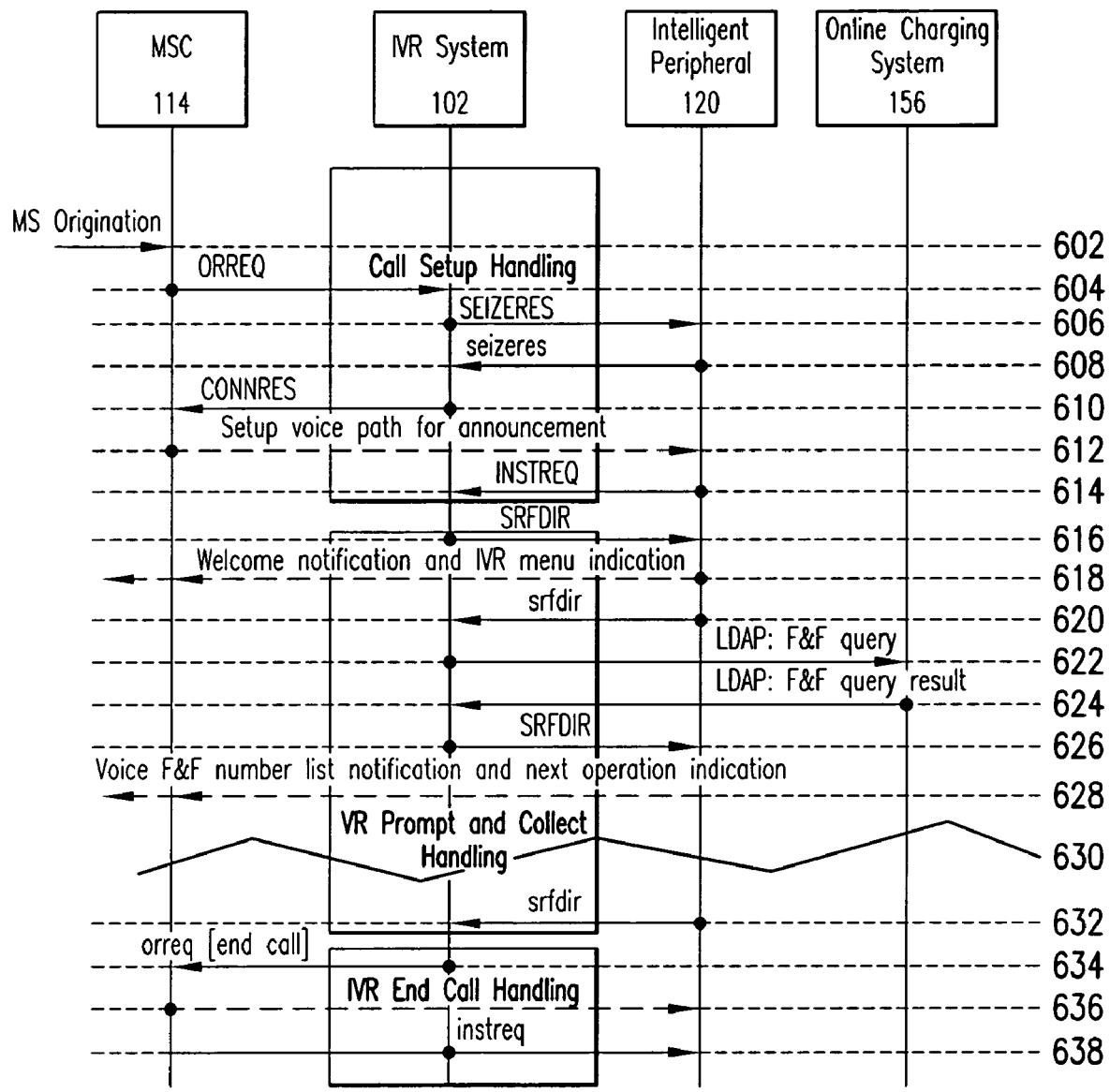
FIG. 6 is a call flow diagram illustrating a flow for an online charging operation using the interactive voice response system of FIG. 1.

The operation of IVR system 102 is further described below with reference to FIG. 6, which is a call flow diagram illustrating exemplary operation of an embodiment of the invention. The example operation shown in FIG. 6 is a user using a mobile device coupled for communication to CDMA network 106 to change a friends and family list. The change to the friends and family list requires payment via an online charging system.

First, in response to a user dialing or inputting a number associated with the desired IVR service, the mobile device originates a call that is received by the serving MSC 114 (602). The serving MSC 114 determines that the called digits from the mobile device indicate an IVR number, and sends the appropriate request to the IVR system 102 over link 145. More specifically, MSC 114 sends an ORREQ (originating request) message to the IVR system 102 with the relevant WIN (wireless intelligent network) trigger in accord with IS826 protocol (604). After the request traverses the protocol layer 134 and is translated into call control messages for common IVR controller 136, call setup handling 202 receives the request. The call setup handling 202 uses the mobile device's MDN (mobile directory number) to access the IVR call control database 140. Through this query, call setup handling 202 determines the mobile device is a valid IVR user.

The IVR system 102, through call setup handling 202, sends a request to reserve resources on the intelligent peripheral, IP and media server 120. More specifically, IVR system 102 sends a SEIZERES (seize resource) message to the IP and media server 120 (606). In response to receiving the SEIZERES message, the IP and media server 120 allocates a TLDN (temporary local directory number) to the appropriate resource. The TLDN is returned to the IVR system 102 in the seizeres (seize resource) message (608).

The IVR system 102 then sends a connection request to the serving MSC 114 with instructions to set up a call leg to the IP and media server 120. This is accomplished via a CONNRES (connect resource) message to the serving MSC (610). The serving MSC 114 sets up the requested call voice path connection to the IP and media server 120 (612). This path is reserved so that the IP and media server 120 can play audio announcements or prompts on the call and receive responses from the caller.

When the call voice path is established with the IP and media server 120, the IP and media server 120 sends a message to IVR system 102 to request control instructions. This is accomplished by sending an INSTREQ (instruction request) message to the IVR system 102 (614). The IVR call handling 202 sends a request to the IP and media server 120 with parameters indicating the appropriate announcement to play, in this case the top level welcome menu. This is accomplished via an SRFDIR (special request function directive) message to the IP and media server 120 (616).

The IP and media server 120 plays the welcome announcement on the established voice path over link 122 (618). The IP and media server 120 collects the digits the end user inputs via the voice connection, and sends the collected digits in a srfdir (special request function directive) message to the IVR system 102 (620). The IP and media server 120 alternatively collects speech via the voice connection and uses speech recognition resources to translate the speech into an appropriate response for IVR system 202.

The IVR system 102 receives the collected digits or other response and determines the appropriate requested action, in this example, a friends and family (F&F) list query. More specifically, call setup handling 202 passes the response from the user to the PAC handling 204. PAC handling 204 uses a service point to send the response to the menu logic 302. Menu logic 302 receives the response and does an access-service-feature operation to access the service feature in service feature logic 304 that executes friends and family (F&F) queries. This F&F service feature sends an LDAP request for subscriber F&F information to online charging system 156 (622).

The online charging systems 156 returns the friend and family phone number list to the IVR system 102 (624). The IVR system then uses an SFDIR message to instruct the IP and media server 120 to take appropriate action (626), in this case an announcement returning a F&F number list notification to the user and a prompt announcement for the next action (628). Further prompt and collect operations may occur as specified in steps 618, 620, 622, 624, 626 and 628, according to the menu logic and any service feature logic (630).

Eventually the end user chooses to end access to the IVR system and inputs a special digit to so indicate or otherwise ends the communication. Then the IP and media server 120 sends an srfdir message to the IVR system 102 to indicate the end of the IVR service/call (632). In response the IVR system 102 sends an orreq (originating request) message to the serving MSC 114 to end the call (634). In response, the serving MSC 114 releases the call leg to the IP and media server 120 (636). And, the IVR system 102 sends an instreq message to the IP and media server 120 to conclude the communication between the IVR system 102 and the IP and media server 120 (638).

The present invention provides an interactive voice response system that is deployed in divergent networks supporting different protocols. The IVR system interfaces to online and offline charging systems. Advantageously an intelligent peripheral is used to provide prompts and collect responses from users from any network coupled to the IVR system. The divergent network protocols are translated to a common set of control messages for communication with a controller in the IVR system. The IVR architecture permits reuse of service features across IVR applications. A telecommunications service provider using the present invention can replace multiple IVR systems used in divergent networks and divergent charging systems with a single IVR system, thereby saving deployment and development costs.

Whereas the present invention has been described with respect to specific embodiments thereof, it will be understood that various changes and modifications will be suggested to one skilled in the art and it is intended that the invention encompass such changes and modifications as fall within the scope of the appended claims.

The invention claimed is:

1. An interactive voice response system comprising:
    a protocol interface that is adapted to communicate with a plurality of divergent telecommunications networks for voice communications;
    a controller that is coupled to the protocol interface to receive a first plurality of common call control messages from the protocol interface and to supply a second plurality of common call control messages to the protocol interface;
    an online charging interface that is coupled to the controller and is adapted to interface with an online charging system;
    an offline charging interface that is coupled to the controller and is adapted to interface with an offline charging system;
    wherein the protocol interface converts control messages from each one of the plurality of divergent telecommunications networks into the first plurality of common call control messages and converts the second plurality of common call control messages into control messages for each one of the plurality of divergent telecommunications networks; and
    wherein the controller generates the second plurality of common call control messages and receives the first plurality of common call control messages to cause a prompt and collect interaction with a caller that is using a device that is coupled to one of the plurality of divergent telecommunications networks.

2. The system of claim 1 wherein the plurality of divergent telecommunications networks includes at least one of: a CDMA network, a GSM network, and a voice over IP network.

3. The system of claim 1 further comprising:
    a media server that is coupled to the protocol interface and to each of the plurality of divergent telecommunications networks, wherein, in response to commands from the controller, the media server provides prompts to the caller and receives responses from the caller.

4. The system of claim 3 wherein the media server provides prompts to the caller and receives responses from the caller over a voice path.

5. The system of claim 4 wherein the media server receives commands from the controller and provides responses to prompts to the controller using a plurality of communications links.

6. The system of claim 5 wherein some communications links of the plurality of communications links are one of an out-of-bound intelligent network protocol and a SIP protocol.

7. The system of claim 1 further comprising a customer care computer coupled to the controller.

8. The system of claim 1 wherein the controller is controlled by service logic that includes a menu logic and a service feature logic, and wherein the menu logic comprises a hierarchical structure of menu options and the service feature logic implements a service feature.

9. The system of claim 8 wherein the service feature is one of a database query, an access to a charging system and a prompt and collect operation.

10. The system of claim 8 wherein the menu options include at least one of: a traverse to sub-menu operation, an access service feature operation, an immediate top-level menu return operation, a menu repeat operation and an exit operation.

11. The system of claim 1 wherein the plurality of call control messages include at least one of: an initial call setup message, an establish connection to intelligent peripheral message, a play announcement message, a prompt and collect message, a prompt and collect result message, a disconnection from intelligent peripheral message, and a disconnect call message.

12. A method for interactive voice response, the method comprising the steps of:
    receiving calls from a plurality of telecommunications networks, wherein at least two networks of the plurality of telecommunications networks operate according to different protocols;
    converting control messages from the at least two networks into a common set of control messages;
    converting the common set of control messages to the at least two networks into control messages according to a protocol for the at least two networks; and
    generating and receiving the common set of control messages to cause a prompt and collect interaction with a caller that is using a device that is coupled to the at least two networks.

13. The method of claim 12 further comprising the steps of:
    sending charging information for the prompt and collect interaction to one of: an online charging system and an offline charging system.

14. The method of claim 13 wherein the step of generating and receiving the common set of control messages to cause a prompt and collect interaction includes a server delivering a prompt to the caller over a voice path.

15. The method of claim 14 wherein the server is coupled to each of the plurality of telecommunications networks.

16. The method of claim 15 wherein the server delivers the prompt to the caller in response to a message from a controller that generates and receives the common set of control messages.

17. The method of claim 16 wherein the controller is controlled by service logic that includes a menu logic and a service feature logic, and wherein the menu logic comprises a hierarchical structure of menu options and the service feature logic implements a service feature.

18. The method of claim 17 wherein the service feature is one of a database query, an access to a charging system and a prompt and collect operation.

19. The method of claim 13 wherein the step of generating and receiving the common set of control messages to cause a prompt and collect interaction includes a server receiving a response from a caller over a voice path.

20. The method of claim 12 wherein the plurality of telecommunications networks includes at least one of: a CDMA network, a GSM network, and a voice over IP network.

* * * * *